United States Patent
Nakai et al.

(10) Patent No.: US 12,443,179 B2
(45) Date of Patent: Oct. 14, 2025

(54) CONTROL DEVICE AND CONTROL METHOD FOR MAINTAINING THE PRODUCTION OF PRODUCT WITH STABLE QUALITY

(71) Applicant: OMRON Corporation, Kyoto (JP)

(72) Inventors: Takaki Nakai, Kyoto (JP); Isamu Namose, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 446 days.

(21) Appl. No.: 18/089,215

(22) Filed: Dec. 27, 2022

(65) Prior Publication Data

US 2023/0236591 A1    Jul. 27, 2023

(30) Foreign Application Priority Data

Jan. 25, 2022  (JP) .................. 2022-009275

(51) Int. Cl.
*G05B 23/02*  (2006.01)
*G05B 13/02*  (2006.01)
*G05B 19/418* (2006.01)

(52) U.S. Cl.
CPC ....... *G05B 23/0294* (2013.01); *G05B 13/024* (2013.01); *G05B 19/41875* (2013.01); *G05B 23/024* (2013.01)

(58) Field of Classification Search
CPC .......................... G05B 23/024; G05B 23/0294; G05B 19/418; G05B 19/41875; G05B 13/024; G05B 2219/32368; Y02P 90/02
See application file for complete search history.

(56) References Cited

U.S. PATENT DOCUMENTS 10,503,146 B2 *  12/2019  Kitamura ............. G05B 19/404
10,527,371 B2 *   1/2020  Kubo .................... F28F 27/00
(Continued)

FOREIGN PATENT DOCUMENTS

CN    1488933 A    4/2004
CN  105181644 A   12/2015
(Continued)

OTHER PUBLICATIONS

Extended European Search Report dated Jun. 15, 2023 in European Application No. 22215574.9.
(Continued)

*Primary Examiner* — Alvin H Tan
(74) *Attorney, Agent, or Firm* — Sughrue Mion, PLLC

(57) ABSTRACT

A control method includes: monitoring a statistic obtained by performing a multivariate analysis on a plurality of parameters; extracting, from the plurality of parameters, a predetermined number of higher-order parameters in terms of an influence degree on fluctuation of the statistic; generating a plurality of experimental patterns according to an experimental design method; acquiring a measurement result of a specific parameter indicating quality of a product when at least one device is controlled according to each of the plurality of experimental patterns; setting a new target value of the predetermined number of higher-order parameters in order to stabilize a value of the specific parameter within a management range based on the measurement result; and controlling the at least one device such that the predetermined number of higher-order parameters approaches the new target value.

8 Claims, 15 Drawing Sheets

(56) References Cited

U.S. PATENT DOCUMENTS

| | | | |
|---|---|---|---|
| 11,106,197 | B2 | 8/2021 | Hattori et al. |
| 11,442,443 | B2* | 9/2022 | Nagano .................. G05B 23/02 |
| 12,174,623 | B2* | 12/2024 | Nagano ..................... F02C 6/18 |
| 2004/0220770 | A1 | 11/2004 | Isumi et al. |
| 2007/0255442 | A1* | 11/2007 | Nakamura ........... G05B 23/024 |
| | | | 700/108 |
| 2013/0268238 | A1 | 10/2013 | McCready |
| 2017/0315961 | A1 | 11/2017 | Natsumeda |
| 2021/0286329 | A1 | 9/2021 | Givot et al. |
| 2021/0325842 | A1 | 10/2021 | Yamanaka et al. |

FOREIGN PATENT DOCUMENTS

| | | |
|---|---|---|
| CN | 106527385 A | 3/2017 |
| CN | 106529034 A | 3/2017 |
| CN | 113617852 A | 11/2021 |
| JP | 2000-252179 A | 9/2000 |
| JP | 2004-145390 A | 5/2004 |
| JP | 2009-289154 A | 12/2009 |
| JP | 2010-218187 A | 9/2010 |
| JP | 2017-138885 A | 8/2017 |
| JP | 2021-192137 A | 12/2021 |
| SG | 188751 A1 | 4/2013 |
| TW | 201351079 A | 12/2013 |

OTHER PUBLICATIONS

Manabu Kano, "Multivariate Statistical Process Control," [online], Jun. 2005, [searched on Jan. 4, 2022], Internet <http://manabukano.brilliantfuture.net/research/report/Report2005_MSPC.pdf>.

Takaaki Tamura, "Part 2—MT system original-MT method", Standardization and Quality Control, 2008, vol. 61, No. 11.

Takaaki Tamura, "Part 5—MT system-TS method and T method capable of direction determination", Standardization and Quality Control, 2009, vol. 62, No. 2.

Takaaki Tamura, "Part 3—State Diagnosis by MT Method", Standardization and Quality Control, 2008, vol. 61, No. 12.

"Concept and utilization of quality engineering at development design stage—System evaluation and improvement without trial and test", [online], [searched on Jan. 4, 2022], Internet<https://foundry.jp/bukai/wpcontent/ uploads/2012/07/e4806f10b0797ec0932d9317dd92a533.pdf>.

Taiwanese Office Action issued Jul. 31, 2023 in Application No. 111148215.

Communication dated Jul. 11, 2025 issued China Patent Office in Application No. 202211630214.8.

Office Action issued Jul. 8, 2025 in Japanese Application No. 2022-009275.

Office Action issued Apr. 30, 2025 in Korean Patent Application No. 10-2022-0178831.

* cited by examiner

FIG.6
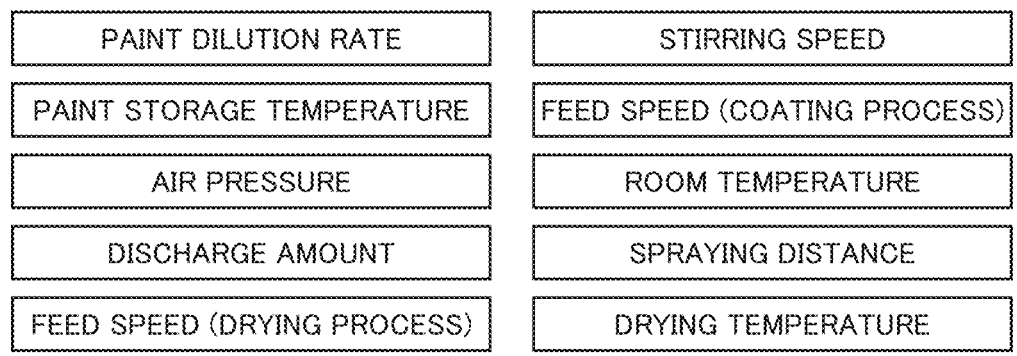
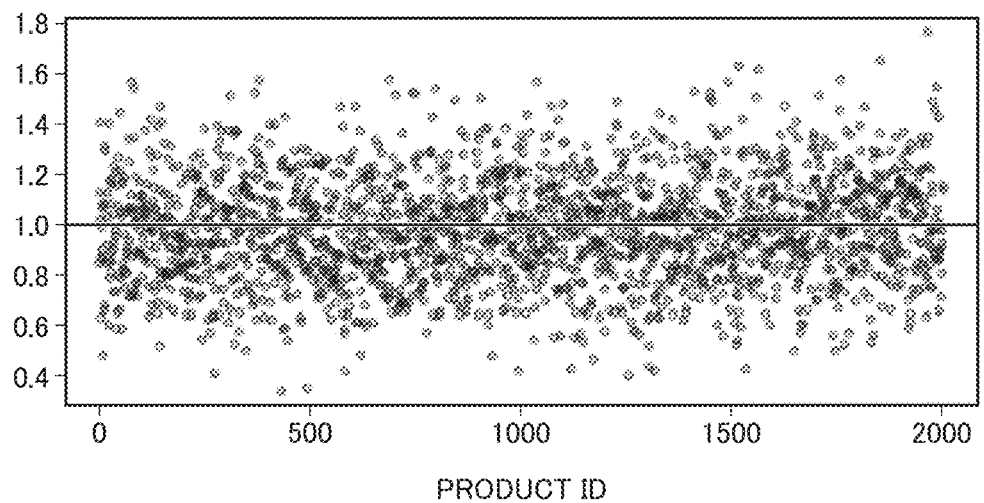

FIG.8
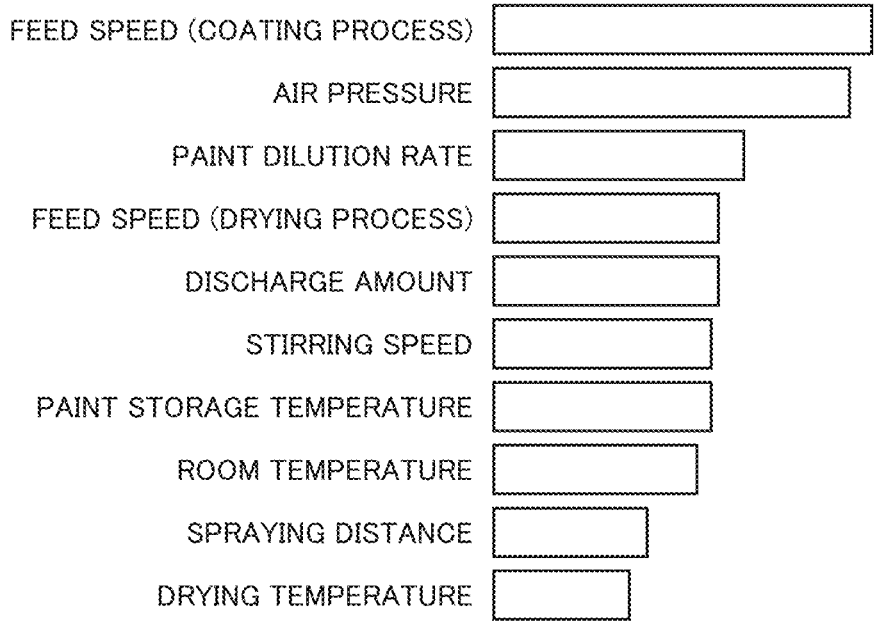
FIG.9
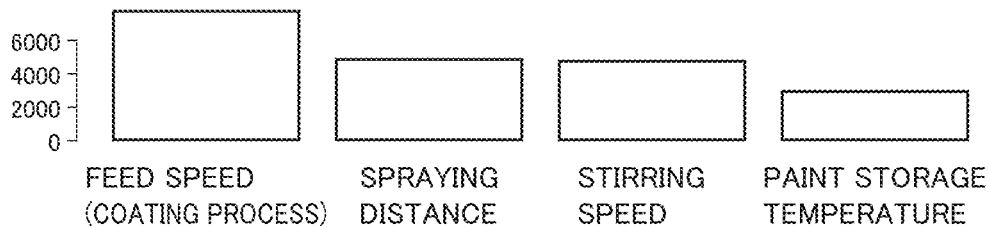
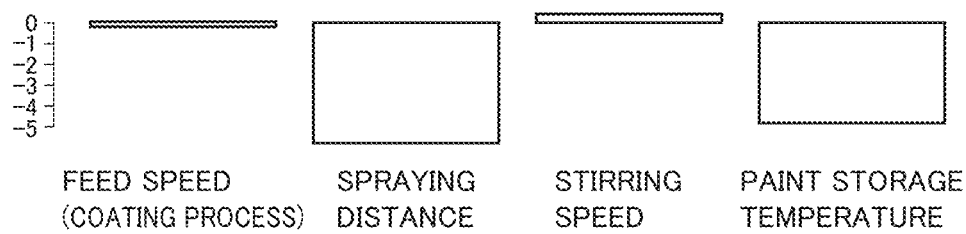

FIG.10

| EXPERIMENTAL PATTERN | FEED SPEED (DRYING PROCESS) | SPRAYING DISTANCE | DRYING TEMPERATURE | FEED SPEED (COATING PROCESS) | DISCHARGE AMOUNT | STIRRING SPEED | PAINT STORAGE TEMPERATURE |
|---|---|---|---|---|---|---|---|
| 1 | 11.68 | 32.06 | 33.46 | 8.9 | 167.85 | 31.81 | 15.98 |
| 2 | 11.68 | 34.22 | 35.58 | 11 | 170.03 | 33.97 | 18.14 |
| 3 | 11.68 | 36.38 | 37.7 | 13.1 | 172.21 | 36.13 | 20.3 |
| 4 | 13.8 | 32.06 | 33.46 | 11 | 170.03 | 36.13 | 20.3 |
| 5 | 13.8 | 34.22 | 35.58 | 13.1 | 172.21 | 31.81 | 15.98 |
| 6 | 13.8 | 36.38 | 37.7 | 8.9 | 167.85 | 33.97 | 18.14 |
| 7 | 15.92 | 32.06 | 35.58 | 8.9 | 172.21 | 33.97 | 20.3 |
| 8 | 15.92 | 34.22 | 37.7 | 11 | 167.85 | 36.13 | 15.98 |
| 9 | 15.92 | 36.38 | 33.46 | 13.1 | 170.03 | 31.81 | 18.14 |
| 10 | 11.68 | 32.06 | 37.7 | 13.1 | 170.03 | 33.97 | 15.98 |
| 11 | 11.68 | 34.22 | 33.46 | 8.9 | 172.21 | 36.13 | 18.14 |
| 12 | 11.68 | 36.38 | 35.58 | 11 | 167.85 | 31.81 | 20.3 |
| 13 | 13.8 | 32.06 | 35.58 | 13.1 | 167.85 | 36.13 | 18.14 |
| 14 | 13.8 | 34.22 | 37.7 | 8.9 | 170.03 | 31.81 | 20.3 |
| 15 | 13.8 | 36.38 | 33.46 | 11 | 172.21 | 33.97 | 15.98 |
| 16 | 15.92 | 32.06 | 37.7 | 11 | 172.21 | 31.81 | 18.14 |
| 17 | 15.92 | 34.22 | 33.46 | 13.1 | 167.85 | 33.97 | 20.3 |
| 18 | 15.92 | 36.38 | 35.58 | 8.9 | 170.03 | 36.13 | 15.98 |

FIG.11

| EXPERIMENTAL NUMBER | FEED SPEED (DRYING PROCESS) | SPRAYING DISTANCE | DRYING TEMPERATURE | FEED SPEED (COATING PROCESS) | DISCHARGE AMOUNT | STIRRING SPEED | PAINT STORAGE TEMPERATURE | MEASUREMENT RESULT |
|---|---|---|---|---|---|---|---|---|
| 1 | 11.68 | 32.06 | 33.46 | 8.9 | 167.85 | 31.81 | 15.98 | 25.69 |
| 2 | 11.68 | 34.22 | 35.58 | 11 | 170.03 | 33.97 | 18.14 | 17.79 |
| 3 | 11.68 | 36.38 | 37.7 | 13.1 | 172.21 | 36.13 | 20.3 | 10.42 |
| 4 | 13.8 | 32.06 | 33.46 | 11 | 170.03 | 36.13 | 20.3 | 15.55 |
| 5 | 13.8 | 34.22 | 35.58 | 13.1 | 172.21 | 31.81 | 15.98 | 17.92 |
| 6 | 13.8 | 36.38 | 37.7 | 8.9 | 167.85 | 33.97 | 18.14 | 18.98 |
| 7 | 15.92 | 32.06 | 35.58 | 8.9 | 172.21 | 33.97 | 20.3 | 18.27 |
| 8 | 15.92 | 34.22 | 37.7 | 11 | 167.85 | 36.13 | 15.98 | 19.68 |
| 9 | 15.92 | 36.38 | 33.46 | 13.1 | 170.03 | 31.81 | 18.14 | 13.43 |
| 10 | 11.68 | 32.06 | 37.7 | 13.1 | 170.03 | 33.97 | 15.98 | 20.04 |
| 11 | 11.68 | 34.22 | 33.46 | 8.9 | 172.21 | 36.13 | 18.14 | 18.60 |
| 12 | 11.68 | 36.38 | 35.58 | 11 | 167.85 | 31.81 | 20.3 | 14.65 |
| 13 | 13.8 | 32.06 | 35.58 | 13.1 | 167.85 | 36.13 | 18.14 | 16.59 |
| 14 | 13.8 | 34.22 | 37.7 | 8.9 | 170.03 | 31.81 | 20.3 | 18.39 |
| 15 | 13.8 | 36.38 | 33.46 | 11 | 172.21 | 33.97 | 15.98 | 17.58 |
| 16 | 15.92 | 32.06 | 37.7 | 11 | 172.21 | 31.81 | 18.14 | 19.40 |
| 17 | 15.92 | 34.22 | 33.46 | 13.1 | 167.85 | 33.97 | 20.3 | 12.37 |
| 18 | 15.92 | 36.38 | 35.58 | 8.9 | 170.03 | 36.13 | 15.98 | 19.66 |

FIG.12

| Source | f | S | V | p |
|---|---|---|---|---|
| T | 18 | 197.341365 | 10.96340917 | 100 |
| FEED SPEED (DRYING PROCESS) | 1 | 1.600854265 | 1.600854265 | 0.81 |
| SPRAYING DISTANCE | 1 | 36.13687723 | 36.13687723 | 18.31 |
| DRYING TEMPERATURE | 1 | 1.133805059 | 1.133805059 | 0.57 |
| FEED SPEED (COATING PROCESS) | 1 | 69.22772277 | 69.22772277 | 35.08 |
| DISCHARGE AMOUNT | 1 | 2.776337504 | 2.776337504 | 1.41 |
| STIRRING SPEED | 1 | 6.727569239 | 6.727569239 | 3.41 |
| PAINT STORAGE TEMPERATURE | 1 | 79.60196298 | 79.60196298 | 40.34 |
| e | 11 | 0.136235992 | 0.01238509 | 0.07 |

CONTROL DEVICE AND CONTROL METHOD FOR MAINTAINING THE PRODUCTION OF PRODUCT WITH STABLE QUALITY

BACKGROUND OF THE INVENTION

Field of the Invention

The present disclosure relates to a control device and a control method.

Description of the Background Art

Manabu Kano, "Multivariate Statistical Process Control," [online], June 2005, [searched on Jan. 4, 2022], Internet manabukano. brilliant-future.net/research/report/Report2005_MSPC. pdf discloses a technique for monitoring an operation state of a production line.

SUMMARY OF THE INVENTION

The operational state of the production line determines quality of a product produced by the production line. For that reason, according to the technique disclosed in Manabu Kano, "Multivariate Statistical Process Control," [online], June 2005, [searched on Jan. 4, 2022], Internet manabu-kano.brilliantfuture.net/research/report/Report2005_MSPC.pdf, when an abnormality in the operation state of the production line is detected, the product with poor quality can be prevented from being produced by executing processing for returning the abnormality to a normality. However, conventionally the processing for returning the abnormality to the normality takes time and effort such as analysis by a person. That is, it takes time and effort to maintain production of the product with stable quality.

The present disclosure has been made in view of the above problems, and an object of the present disclosure is to provide a control device and a control method capable of maintaining the production of the product with the stable quality.

According to an example of the present disclosure, a control device controlling at least one device included in a production line producing a product includes a monitoring portion, an extraction portion, a generation portion, an experiment execution portion, a setting portion, and a controller. The monitoring portion monitors a statistic obtained by performing a multivariate analysis on a plurality of parameters related to an operation of the at least one device. The extraction portion extracts, from the plurality of parameters, a predetermined number of higher-order parameters in terms of an influence degree on fluctuation of the statistic, in response to a fact that the fluctuation of the statistic is larger than a reference. The generation portion generates a plurality of experimental patterns in which combinations of target values of the predetermined number of higher-order parameters are different from each other according to an experimental design method. The experiment execution portion acquires, for each of the plurality of experimental patterns, a measurement result of a specific parameter indicating quality of the product when the at least one device is controlled according to the experimental pattern. The setting portion sets a new target value of the predetermined number of higher-order parameters in order to stabilize a value of the specific parameter within a management range based on the measurement result. The controller controls the at least one device such that the predetermined number of higher-order parameters approaches the new target value.

According to this disclosure, when any abnormality is generated in the operation state of the at least one device, the target value of the parameter that is the factor candidate for the abnormality among the plurality of parameters related to the operation of the at least one device is changed such that the quality of the product is stabilized. As a result, the production of the product with stable quality is maintained.

In the above disclosure, the experimental design method is preferably a method using an orthogonal table. This increases efficiency of the experiment using the plurality of experimental patterns.

In the above disclosure, for example, PCA, PLS, a MT method, a T method, and the like are used as a method of multivariate analysis.

In the above disclosure, the setting portion performs a variance analysis on the measurement result to calculate a contribution rate of each of the predetermined number of higher-order parameters, selects at least one target parameter that is a setting target of the target value from the predetermined number of higher-order parameters based on the contribution rate, and sets the new target value of the at least one target parameter.

According to the above disclosure, the parameter having large contribution to the fluctuation of the specific parameter is determined as the target parameter. Thus, the value of the specific parameter can be easily stabilized within the management range by setting the new target value for the target parameter.

In the above disclosure, the generation portion generates the plurality of experimental patterns such that each value of the predetermined number of higher-order parameters is any one of a first level, a second level, and a third level. The second level is a current target value. The first level is smaller than the second level. The third level is larger than the second level. The first level and the third level are determined such that the value of the specific parameter falls within the management range.

According to the above disclosure, the production of the defective product can be prevented even when the experiment according to the plurality of experimental patterns is executed during the production of the product. As a result, the production of the product with stable quality can be continued without stopping the production line.

According to another example of the present disclosure, a control method for controlling at least one device included in a production line for producing a product includes first to sixth steps. The first step is a step of monitoring a statistic obtained by performing a multivariate analysis on a plurality of parameters related to an operation of the at least one device. The second step is a step of extracting, from the plurality of parameters, a predetermined number of higher-order parameters in terms of an influence degree on fluctuation of the statistic, in response to a fact that the fluctuation of the statistic is larger than a reference. The third step is a step of generating a plurality of experimental patterns in which combinations of target values of the predetermined number of higher-order parameters are different from each other according to the experimental design method. The fourth step is a step of acquiring, for each of a plurality of experimental patterns, a measurement result of a specific parameter indicating quality of the product when the at least one device is controlled according to the experimental pattern. The fifth step is a step of setting a new target value of the predetermined number of higher-order parameters in order to stabilize a value of the specific parameter within a management range based on the measurement result. The sixth step is a step of controlling the at least one device such that the predetermined number of higher-order parameters approaches the new target value. The above disclosure also maintains the production of the product with stable quality.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a view illustrating an example of a statistic obtained by performing multivariate analysis.

FIG. 8 is a view illustrating an example of a factor effect diagram.

FIG. 9 is a view illustrating an example of an SN ratio and a proportional constant $\beta$ of each parameter calculated using a T method.

FIG. 10 is a view illustrating an example of an experimental pattern generated according to an experimental design method.

FIG. 11 is a view illustrating an example of a measurement result acquired by an experiment execution portion.

FIG. 12 is a view illustrating an example of a result of variance analysis by a setting portion.

DESCRIPTION OF THE PREFERRED EMBODIMENTS

Figure 1:
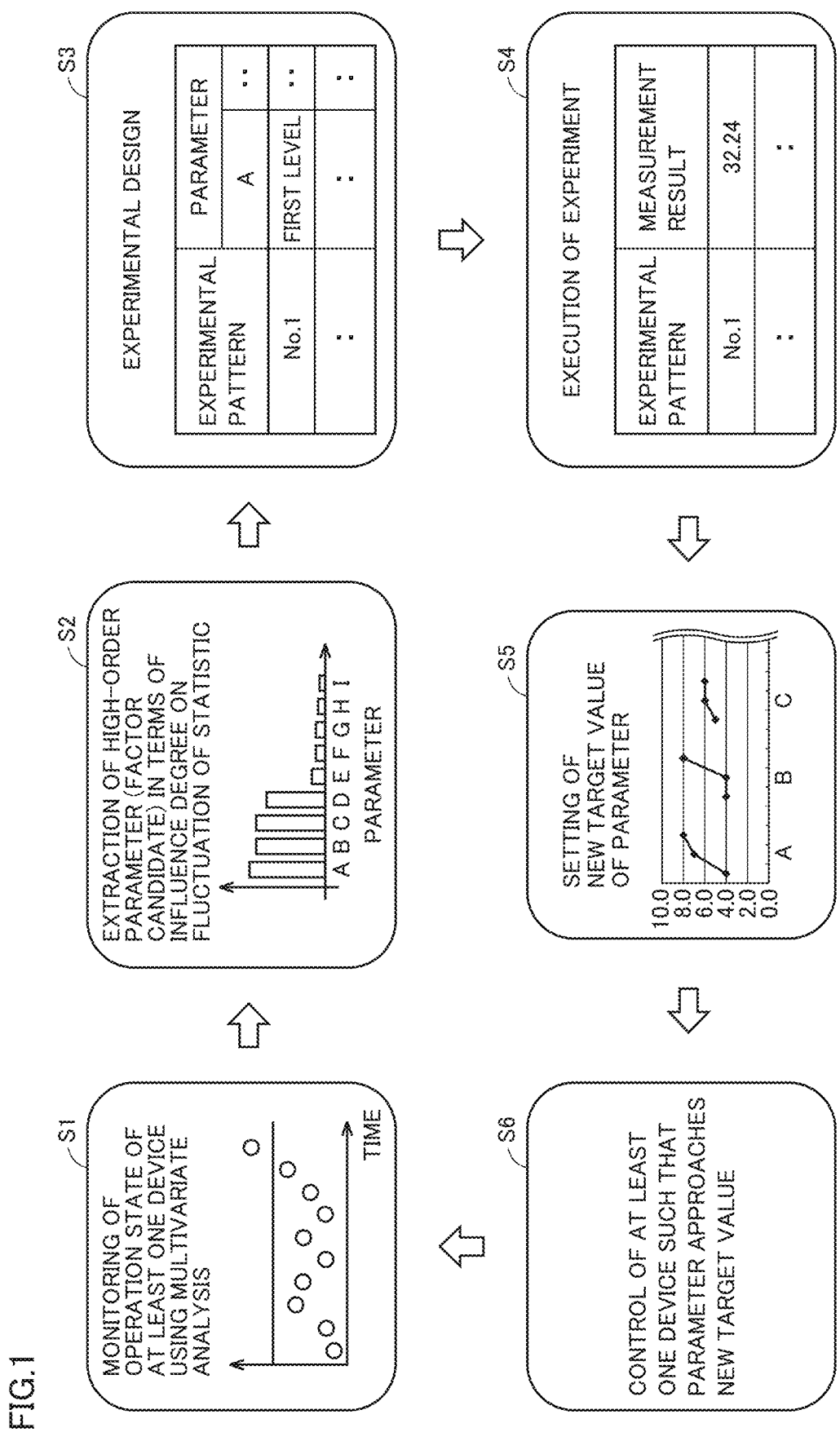
FIG. 1 is a schematic diagram illustrating a flow of a control method according to an embodiment.

With reference to the drawings, an embodiment of the present invention will be described in detail. The same or equivalent part in the drawings is denoted by the same reference numeral, and the description will not be repeated.

§ 1 Application Example

With reference to FIG. 1, an example of a scene to which the present invention is applied will be described. FIG. 1 is a schematic diagram illustrating a flow of a control method according to an embodiment. FIG. 1 illustrates the flow of the control method for controlling at least one device included in a production line producing a product. The control method in FIG. 1 is executed by at least one processor. At least one processor may be incorporated in one control device, or distributed and arranged in a plurality of control devices capable of communicating with each other.

As illustrated in FIG. 1, the control method includes steps S1 to S6. Steps S1 to S6 are repeatedly executed in this order.

Step S1 is a step of monitoring a statistic obtained by performing a multivariate analysis on a plurality of parameters related to the operation of the at least one device included in the production line. The statistic indicates an operation state of the at least one device. Accordingly, the operation state of the at least one device is monitored.

Step S2 is a step of extracting, from the plurality of parameters, a predetermined number of higher-order parameters in terms of an influence degree on the fluctuation of the statistic, according to the fact that the fluctuation of the statistic is larger than a reference. The statistic fluctuates when any abnormality is generated in the operation state of the at least one device. For this reason, when the fluctuation of the statistic is larger than the reference, it means that some abnormality is generated in the operation state of the at least one device. The predetermined number of higher-order parameters extracted in step S2 is listed as a factor candidate for the abnormality of the operation state of the at least one device.

Step S3 is a step of generating a plurality of experimental patterns in which combinations of target values of the predetermined number of higher-order parameters are different from each other according to the experimental design method. Step S4 is a step of acquiring, for each of a plurality of experimental patterns, a measurement result of a specific parameter indicating the quality of the product when the at least one device is controlled according to the experimental pattern. The fluctuation in the quality of the product when the values of the predetermined number of higher-order parameters are changed is checked by the execution of steps S3, S4.

Step S5 is a step of setting a new target value of the predetermined number of higher-order parameters in order to stabilize the specific parameter in the prescribed range based on the measurement result. Step S6 is a step of controlling the at least one device such that the predetermined number of higher-order parameters approaches the new target value. The quality of the product is stabilized by steps S5, S6.

As described above, by the execution of steps S1 to S6, when any abnormality is generated in the operation state of the at least one device, the target value of the parameter that is the factor candidate for the abnormality among the plurality of parameters related to the operation of the at least one device is changed such that the quality of the product is stabilized. As a result, the production of the product with stable quality is maintained.

Steps S1 to S6 can be executed during the production of the product. Accordingly, the production of the product with stable quality can be continued without stopping the production line.

§ 2 Specific Example

<System Configuration>

Figure 2:
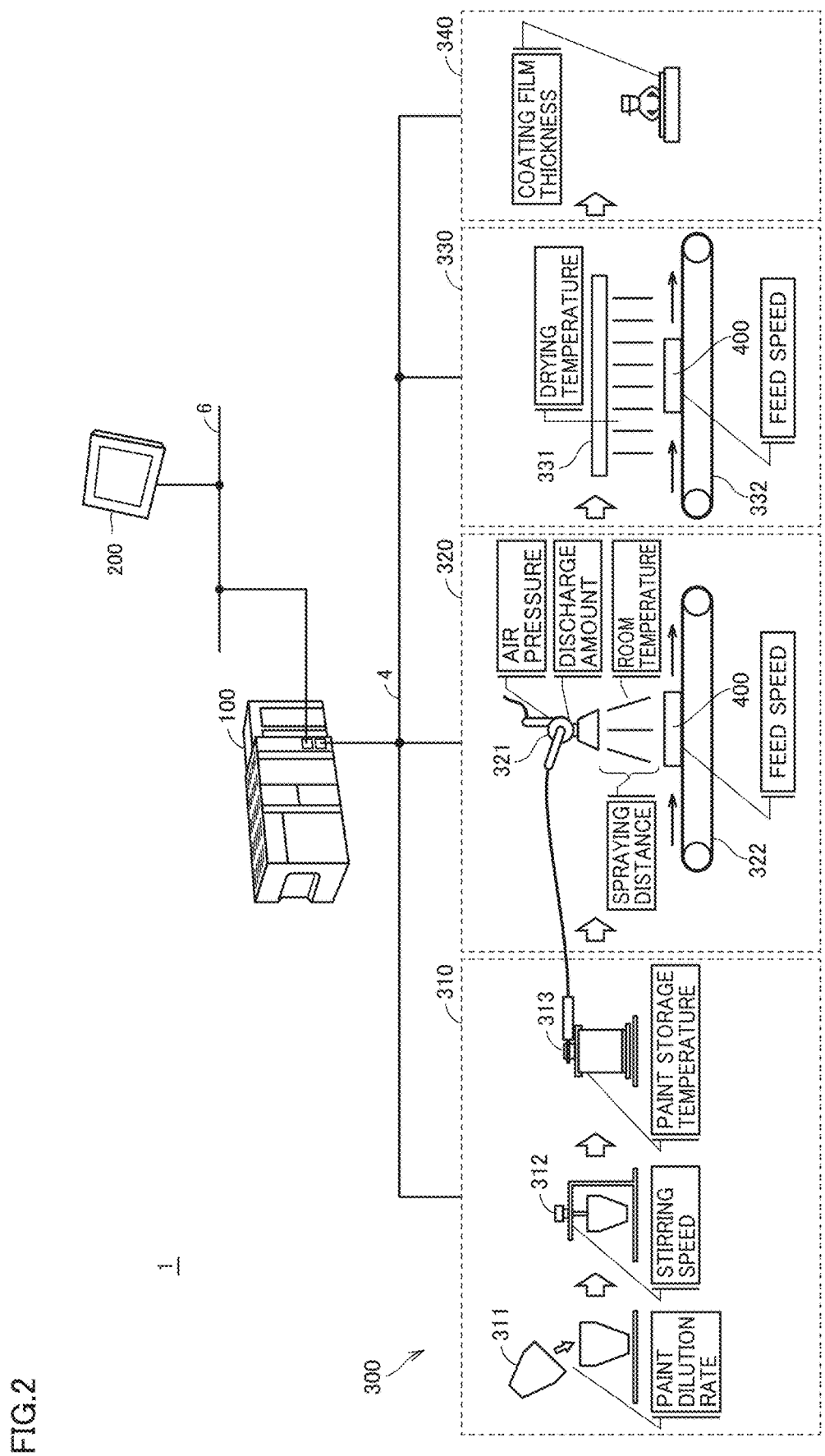
FIG. 2 is a view illustrating a configuration of a system to which a control device of the embodiment is applied.

FIG. 2 is a view illustrating a configuration of a system to which a control device of the embodiment is applied. As illustrated in FIG. 2, a system 1 includes a control device 100, a human machine interface (HMI) 200, and a production line 300. Control device 100 is communicably connected to HMI 200 through an information system network 6. Control device 100 and at least one device included in production line 300 are communicably connected to each other through a control system network 4.

Control device 100 is typically a programmable logic control device (PLC), and controls the at least one device included in production line 300.

HMI 200 includes a function of presenting information to a user and a function of receiving an operation from the user. In the embodiment, HMI 200 provides the user with a temporal change in a statistic monitored by control device 100.

Production line 300 includes the at least one device producing the product. Production line 300 in FIG. 2 produces a metal plate 400 to which paint is applied. Production line 300 includes a paint preparation process 310, a coating process 320, a drying process 330, and an inspection process 340.

The device installed in paint preparation process 310 includes a raw material feeder 311, a stirrer 312, and a paint storage 313. Raw material feeder 311 is a device that feeds a raw material of paint (pigment, resin, additive, solvent, and the like) into a container. Stirrer 312 stirs and mixes the raw materials in the container. Paint storage 313 stores the paint at an appropriate temperature (paint storage temperature) in order to maintain viscosity of the paint within a predetermined range. Parameters related to the operation of the device installed in paint preparation process 310 include a paint dilution rate, a stirring speed and a paint storage temperature.

The device installed in coating process 320 includes a paint device 321 and a belt conveyor 322. Paint device 321 uses compressed air to blow the paint supplied from paint storage 313 onto metal plate 400 conveyed by belt conveyor 322. The parameters related to the operation of the device installed in coating process 320 include a feed speed of metal plate 400 by belt conveyor 322, pressure (air pressure) of the compressed air, a discharge amount of the paint from paint device 321, a distance (spraying distance) between paint device 321 and metal plate 400, and a room temperature around paint device 321.

The device installed in drying process 330 includes a dryer 331 and a belt conveyor 332. Dryer 331 heats metal plate 400 conveyed by belt conveyor 332 to dry the paint on metal plate 400. The parameters related to the operation of the device installed in drying process 330 include the feed speed of metal plate 400 by belt conveyor 332 and a drying temperature.

The values of the parameters relating to the operation of the device installed in paint preparation process 310, coating process 320, and drying process 330 are collected by control device 100. The value of the parameter may be measured by a sensor included in the device, or calculated based on data (command value or the like) output from control device 100 to the device.

Inspection process 340 is a process of measuring a coating film thickness of metal plate 400. The coating film thickness may be measured by an operator, or automatically measured using a film thickness measuring machine. The coating film thickness measured in inspection process 340 corresponds to the specific parameter indicating the quality of the product produced by production line 300.

<Hardware Configuration of Control Device>

Figure 3:
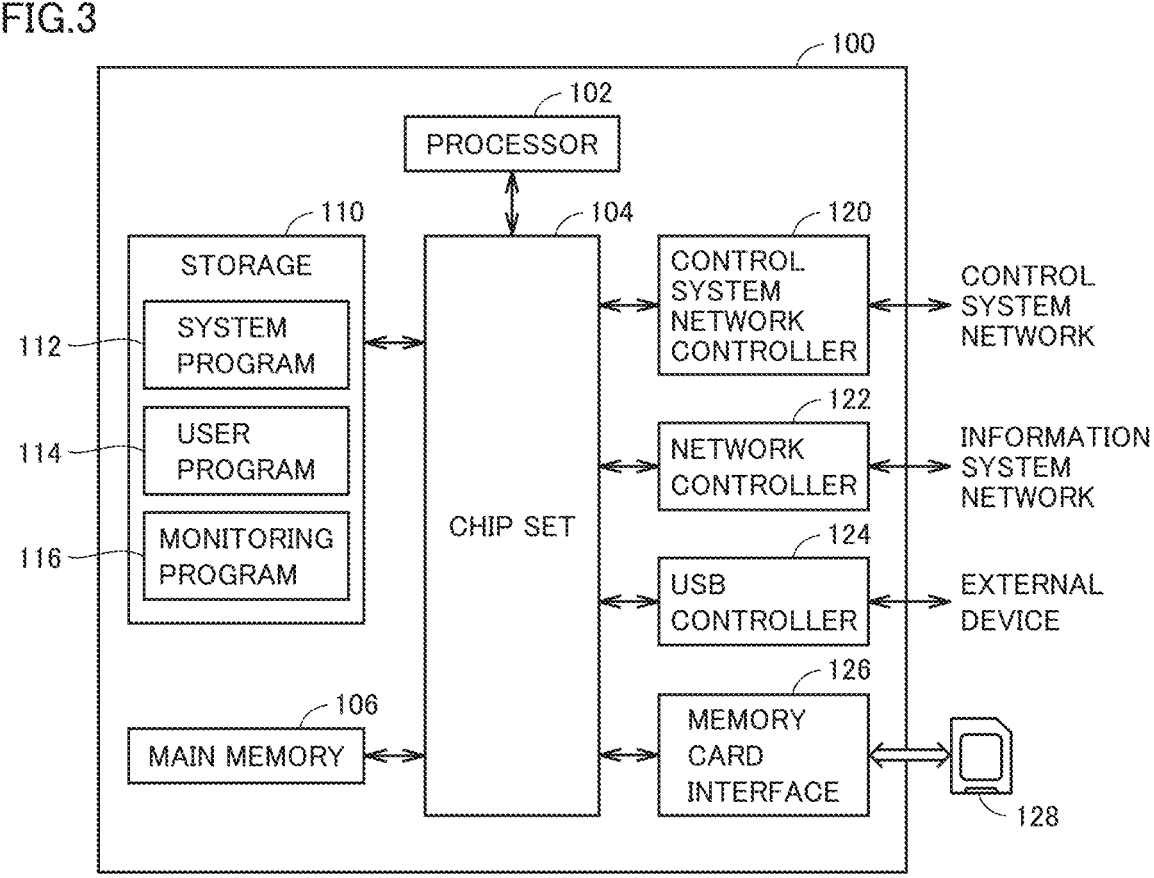
FIG. 3 is a block diagram illustrating a hardware configuration example of the control device of the embodiment.

FIG. 3 is a block diagram illustrating a hardware configuration example of the control device of the embodiment. Control device 100 is typically a programmable logic control device (PLC). As illustrated in FIG. 3, control device 100 includes a processor 102 such as a central processing unit (CPU) or a micro-processing unit (MPU), a chip set 104, a main memory 106, a storage 110, a control system network controller 120, an information system network controller 122, and a USB controller 124, and a memory card interface 126.

Processor 102 reads various programs stored in storage 110, expands the various programs in main memory 106, and executes the various programs, thereby implementing the arithmetic operation controlling the control target. Chip set 104 controls data transmission and the like between processor 102 and each component.

Storage 110 stores a system program 112 implementing basic processing, a user program 114 implementing the control arithmetic operation, and a monitoring program 116 monitoring the operation state of the at least one device included in production line 300.

Control system network controller 120 controls data exchange with the device through control system network 4.

Information system network controller 122 controls the data exchange with HMI 200 and the like through information system network 6.

USB controller 124 controls the data exchange with an external device (for example, a support device) through USB connection.

Memory card interface 126 is configured such that memory card 128 is detachable, and can write data to memory card 128 and read various data (such as a user program) from memory card 128.

Although the configuration example in which the required function is provided by processor 102 executing the program has been illustrated in FIG. 3, some or all of these provided functions may be mounted using the dedicated hardware circuit (for example, the ASIC or the FPGA). Alternatively, a main part of control device 100 may be implemented using hardware (for example, an industrial personal computer based on a general-purpose personal computer) according to a general-purpose architecture. In this case, the plurality of OSs having different uses may be executed in parallel using a virtualization technology, and the required application may be executed on each OS.

<Functional Configuration of Control Device>

Figure 4:
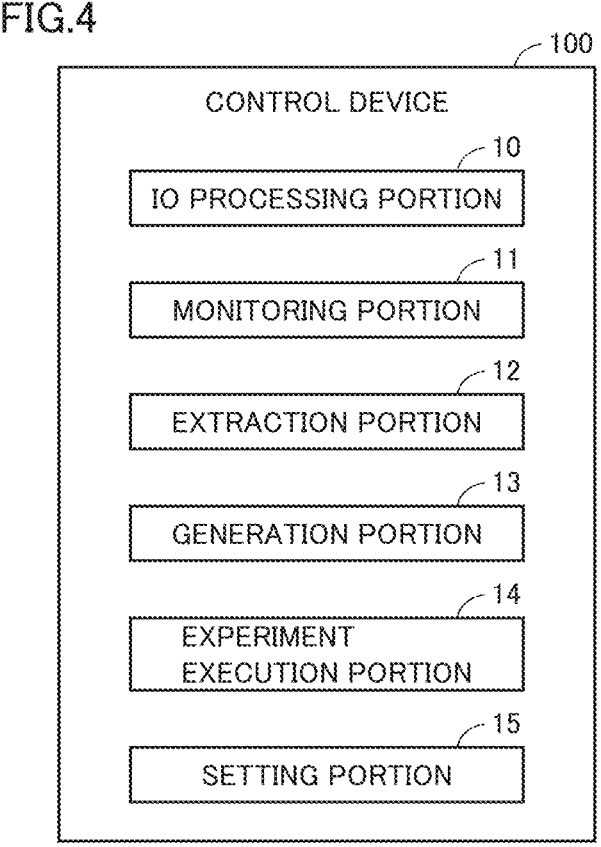
FIG. 4 is a block diagram illustrating a functional configuration example of the control device of the embodiment.

FIG. 4 is a block diagram illustrating a functional configuration example of the control device of the embodiment. As illustrated in FIG. 4, control device 100 includes an IO processing portion 10, a monitoring portion 11, an extraction portion 12, a generation portion 13, an experiment execution portion 14, and a setting portion 15. IO processing portion 10 is implemented by processor 102 executing user program 114. Monitoring portion 11, extraction portion 12, generation portion 13, experiment execution portion 14, and setting portion 15 are implemented by processor 102 executing monitoring program 116.

IO processing portion 10 executes collection processing, control calculation processing, and output processing. The collection processing is processing for collecting data from the at least one device included in production line 300. The control arithmetic processing is arithmetic processing for controlling the at least one device included in production line 300, and the collected data is used in the control arithmetic processing. The output processing is processing for outputting data obtained through the control arithmetic processing to the at least one device included in production line 300.

The data collected by the collection processing includes data indicating values of a plurality of parameters (paint dilution rate, stirring speed, paint storage temperature, feed speed (coating process), air pressure, room temperature, discharge amount, spraying distance, feed speed (drying process), drying temperature)) related to the operation of the at least one device included in production line 300. Furthermore, the data collected by the collection processing includes data indicating the value of the specific parameter (coating film thickness) indicating the quality of the product produced by production line 300.

A target value is previously determined for each of the plurality of parameters related to the operation of the at least one device included in production line 300. The target value of each parameter is determined such that the specific parameter "coating film thickness" falls within the management range. IO processing portion 10 executes the control arithmetic processing in which each of the plurality of parameters related to the operation of the at least one device approaches the target value, and outputs the data obtained by the control arithmetic processing to the at least one device.

Figure 5:
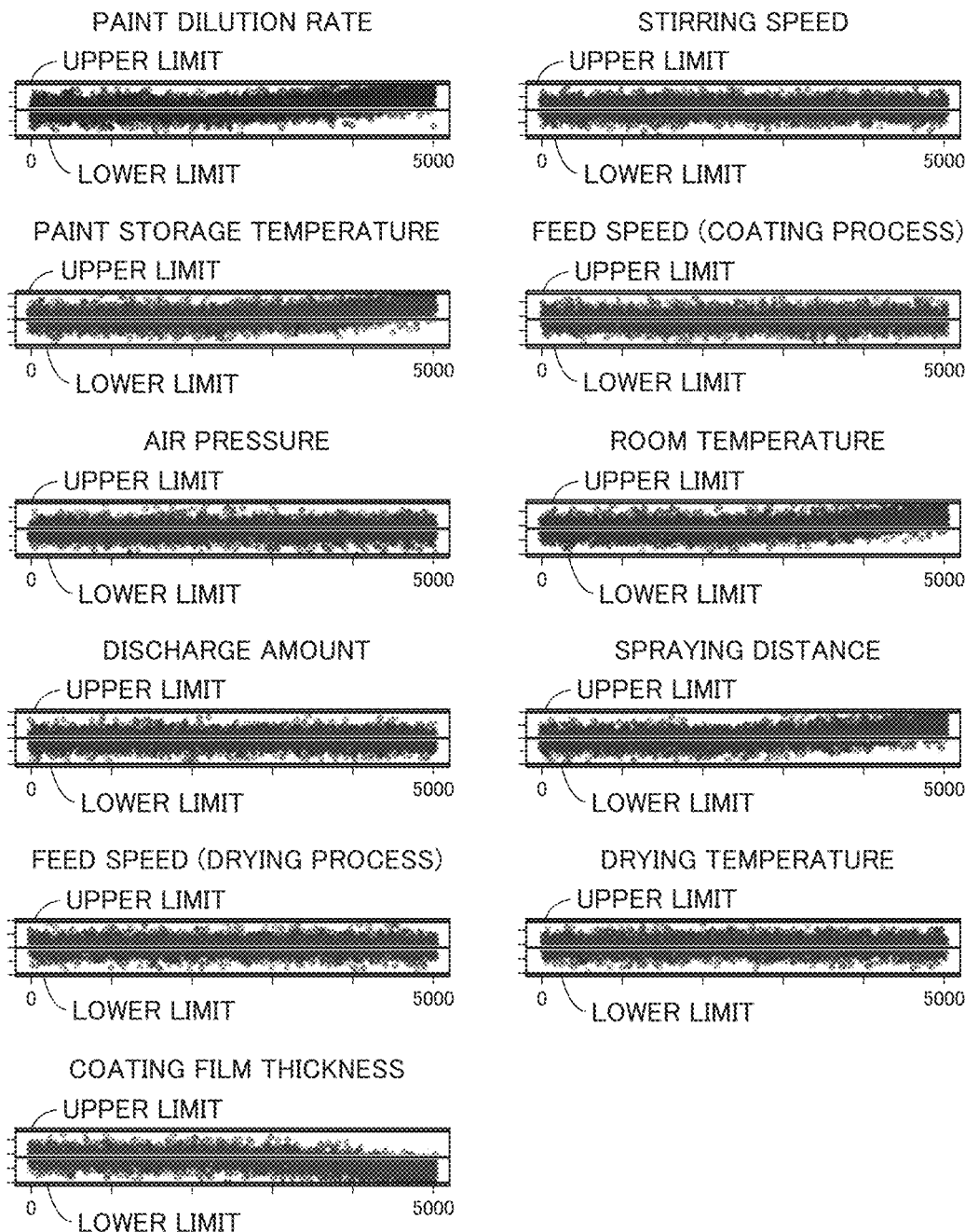
FIG. 5 is a view illustrating transition of a value of a parameter collected by collection processing.

FIG. 5 is a view illustrating transition of the value of the parameter collected by the collection processing. FIG. 5 illustrates graphs illustrating changes with time of values of parameters "coating dilution rate", "stirring speed", "paint storage temperature", "feed speed (coating process)", "air pressure", "room temperature", "discharge amount", "spraying distance", "feed speed (drying process)", "drying temperature", and "coating film thickness". In each graph, a horizontal axis represents a product ID, and a vertical axis represents the value of the parameter. In the example of FIG. 5, product ID is represented by a serial number. An upper limit and a lower limit that define the management range are indicated in each graph.

IO processing portion 10 manages the collected data in association with product ID. The plurality of devices included in production line 300 perform processing on the same product or the paint applied to the product at different timings. The deviation (time lag) in the timing of the processing is caused by a conveyance time of the product between the processes, a preparation time of the paint, and the like, and is previously measured by an experiment or the like. For this reason, when the collected data is managed in association with product ID, the plurality of parameters in performing the processing on the same product or the paint applied to the product are associated with each other. IO processing portion 10 may manage the collected data using a time stamp instead of product ID.

In the example of FIG. 5, the values of the four parameters "paint dilution rate", "paint storage temperature", "room temperature", and "spraying distance" fluctuate in the products with product ID exceeding "3500". Specifically, the values of the four parameters increase. Thereafter, the specific parameter "coating film thickness" is less than the lower limit value in the products having product ID near "4600". As described above, at a stage before the quality of the product deviates from the management range, the abnormality is observed in the operation state of the at least one device included in production line 300 that produces the product. For this reason, control device 100 of the embodiment monitors the operation state of the at least one device included in production line 300, and sets the new target value of the parameter related to the operation of the at least one device according to the monitoring result.

Monitoring portion 11 (see FIG. 4) monitors the operation state of the at least one device included in production line 300. Specifically, monitoring portion 11 monitors the statistic obtained by performing the multivariate analysis on the plurality of parameters related to the operation of the at least one device. The statistic represents a correlation between the plurality of parameters. Accordingly, the statistic is also stable when the correlation between the plurality of parameters is stable, and the statistic also fluctuates when the correlation between the plurality of parameters fluctuates.

The multivariate analysis is a technique for statistically treating the multivariate data including a plurality of explanatory variables. Monitoring portion 11 may use a known multivariate analysis technique. For example, monitoring portion 11 monitors the statistic obtained using a Mahalanobis Taguchi (MT) method.

FIG. 6 is a view illustrating an example of the statistic obtained by performing the multivariate analysis. FIG. 6 illustrates the transition of a Mahalanobis distance, which is the statistic obtained by applying the MT method to 10 parameters "paint dilution rate", "stirring speed", "paint storage temperature", "feed speed (coating process)", "air pressure", "room temperature", "discharge amount", "spraying distance", "feed speed (drying process)", and "drying temperature". The Mahalanobis distance indicates a distance from a unit space. The unit space is previously generated from a sample data group obtained when production line 300 is operating normally. Each of the plurality of sample data sets included in the sample data group indicates 10 parameter values. As illustrated in FIG. 6, when the operation of the at least one device included in production line 300 is normal, the Mahalanobis distance is distributed around 1. Monitoring portion 11 calculates the Mahalanobis distance using, for example, the technique disclosed in "Takaaki Tamura, "Part 2—MT system original-MT method", Standardization and Quality Control, 2008, Vol. 61, No. 11".

Figure 7:
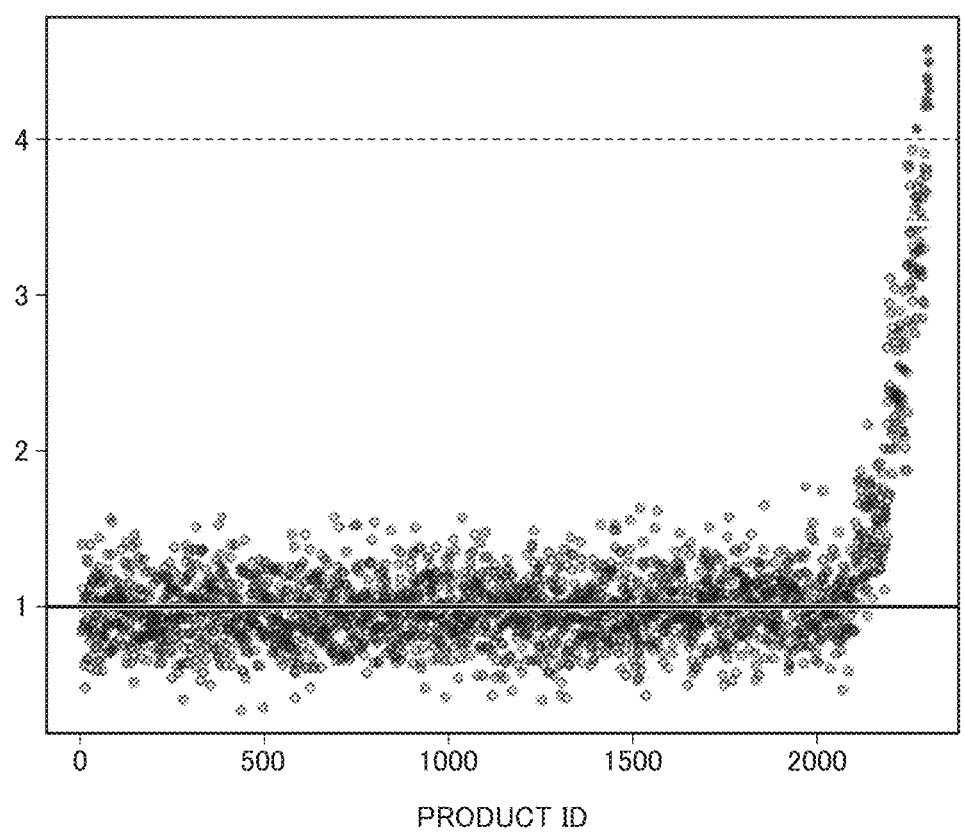
FIG. 7 is a view illustrating an example of transition of the statistic when an abnormality is generated in operation of at least one device.

FIG. 7 is a view illustrating an example of transition of the statistic when the abnormality is generated in operation of the at least one device. FIG. 7 illustrates the transition of the Mahalanobis distance. As illustrated in FIG. 7, the statistic fluctuates when the abnormality is generated in the operation of the at least one device included in production line 300. For this reason, monitoring portion 11 notifies extraction portion 12 of the generation of the abnormality according to the fact that the fluctuation of the statistic is larger than the reference. Specifically, monitoring portion 11 determines whether the value of the statistic falls within a predetermined range (in the example of FIG. 7, the range is less than or equal to 4), and notifies extraction portion 12 of the generation of the abnormality in response to the value of the statistic falling outside the predetermined range.

Monitoring portion 11 may monitor the statistic obtained using the multivariate analysis other than the MT method. For example, PCA (Principal Component Analysis), PLS (Partial Least Squares), and T method (Taguchi method) can be cited as examples of the multivariate analysis other than the MT method.

For example, monitoring portion 11 may monitor the Q statistic obtained using the PCA. The Q statistic is calculated using the method disclosed in Manabu Kano, "Multivariate Statistical Process Control," [online], June 2005, [searched on Jan. 4, 2022], Internet manabukano. brilliantfuture.net/research/report/Report2005_MSPC. pdf.

Alternatively, monitoring portion 11 may monitor a prediction value obtained using the T method. The prediction value is a value of the specific parameter "coating film thickness" predicted from all or a part of the 10 parameters "coating dilution rate", "stirring speed", "paint storage temperature", "feed speed (coating process)", "air pressure", "room temperature", "discharge amount", "spraying distance", "feed speed (drying process)", and "drying temperature". The prediction value is calculated using the technique disclosed in "Takaaki Tamura, "Part 5—MT system-TS method and T method capable of direction determination", Standardization and Quality Control, 2009, Vol. 62, No. 2".

Extraction portion 12 (see FIG. 4) extracts, from the plurality of parameters, the predetermined number of higher-order parameters in terms of the influence degree on the fluctuation of the statistic, in response to the fact that the fluctuation of the statistic is larger than the reference.

For example, when the MT method is used as the multivariate analysis, extraction portion 12 extracts the predetermined number of higher-order parameters using the technique disclosed in "Takaaki Tamura, "Part 3—State Diagnosis by MT Method", Standardization and Quality Control, 2008, Vol. 61, No. 12". Specifically, extraction portion 12 acquires an abnormal data set indicating the values of the 10 parameters "coating dilution rate", "stirring speed", "paint storage temperature", "feed speed (coating process)", "air pressure", "room temperature", "discharge amount", "spraying distance", "feed speed (drying process)", and "drying temperature" when it is determined that the fluctuation in the statistic is larger than the reference. For each combination of at least one parameter selected from the 10 parameters, extraction portion 12 calculates the Mahalanobis distance of the abnormal data set using the unit space corresponding to the combination. The unit space corresponding to each combination is previously generated using the sample data group obtained when production line 300 operates normally. Extraction portion 12 produces a factor effect diagram of 10 parameters based on the Mahalanobis distance calculated for each combination, and extracts the predetermined number of higher-order parameters in terms of a factor effect. The factor effect diagram represents the influence degree of each parameter on the Mahalanobis distance.

For example, when the Mahalanobis distance calculated using the unit space corresponding to the combination including the parameter "coating dilution rate" is larger than the Mahalanobis distance calculated using the unit space corresponding to the combination not including the parameter "coating dilution rate", the influence degree of the parameter "coating dilution rate" on the Mahalanobis distance is high.

FIG. 8 is a view illustrating an example of the factor effect diagram. In FIG. 8, the horizontal axis represents the influence degree on the Mahalanobis distance. Extraction portion 12 is only required to extract the predetermined number (for example, 7) of higher-order parameters in terms of the influence degree in the factor effect diagram.

When the PCA is used as the multivariate analysis, extraction portion 12 may extract the predetermined number of higher-order parameters in terms of the influence degree on the fluctuation of the Q statistic based on a contribution plot of each parameter to the Q statistic. Extraction portion 12 calculates the contribution plot of each parameter to the Q statistic using the calculation method disclosed in Manabu Kano, "Multivariate Statistical Process Control," [online], June 2005, [searched on Jan. 4, 2022], Internet manabu-kano.brilliantfuture.net/research/report/Report2005_MSPC.pdf. Specifically, extraction portion 12 calculates the square of the difference between the average value of the values of the parameters in the sample data group and the value of the parameter in the abnormal data set as the contribution plot. The higher the contribution plot, the higher the influence degree on the fluctuation of the Q-statistic. For this reason, extraction portion 12 extracts the predetermined number of higher-order parameters in terms of the contribution plot.

When the T method is used as the multivariate analysis, extraction portion 12 may extract the predetermined number of higher-order parameters in terms of the influence degree on the fluctuation of the statistic based on an SN ratio and a proportional constant $\beta$ of each parameter.

FIG. 9 is a view illustrating an example of an SN ratio and the proportional constant $\beta$ of each parameter calculated using the T method. Extraction portion 12 calculates the SN ratio and the proportionality constant $\beta$ of each parameter using the calculation method disclosed in "Takaaki Tamura, "Part 5—MT system-TS method and T method capable of direction determination", Standardization and Quality Control, 2009, Vol. 62, No. 2". The proportionality constant $\beta$ indicates a slope of a single linear regression. The SN ratio represents linearity between a parameter value and a true value. The parameter having a larger value of the SN ratio indicates the higher contribution to estimation accuracy. For this reason, extraction portion 12 extracts the predetermined number of higher-order parameters in terms of the SN ratio. Alternatively, extraction portion 12 may correct the SN ratio using a weighting coefficient corresponding to the proportionality constant $\beta$, and extract the predetermined number of higher-order parameters in terms of the SN ratio after correction.

Generation portion 13 (see FIG. 4) generates a plurality of experimental patterns in which combinations of target values of the predetermined number of higher-order parameters extracted by extraction portion 12 are different from each other according to the experimental design method. For example, generation portion 13 uses an orthogonal table as the experimental design method. A size of the orthogonal table is determined by the number of parameters extracted by extraction portion 12. For example, when extraction portion 12 extracts 7 parameters, generation portion 13 generates 18 experimental patterns by setting the value of each parameter to one level selected from three levels using an L18 orthogonal table. The three levels include a first level, a second level, and a third level. The second level is a current target value. The first level is smaller than the second level, and the third level is larger than the second level. The first level and the third level are limited to a range in which the specific parameter "coating film thickness" falls within the management range. As a result, the production of the defective product can be prevented even when the experiment according to the plurality of experiment patterns is executed during the production of the product. As a result, the production of the product with stable quality can be continued without stopping the production line. Specifically, the difference between the second level and the first level and the difference between the third level and the second level are determined as follows:

$(3/2)^{1/2} n\sigma$ when response corresponding to $n\sigma$ is wanted.

For example, when a tolerance $\Delta=3\sigma$, generation portion 13 sets the first level and the third level according to:
first level=second level$-(3/2)^{1/2}\sigma$
third level=second level$+(3/2)^{1/2}\sigma$ FIG. 10 is a view illustrating an example of the experimental pattern generated according to the experimental design method. FIG. 10 illustrates 18 experimental patterns in which the values of the parameters "feed speed (drying process)", "spraying distance", "drying temperature", "feed speed (coating process)", "stirring speed", and "paint storage temperature" are set to any of three levels.

Experiment execution portion 14 (see FIG. 4) acquires, for each of the plurality of experiment patterns, a measurement result of the specific parameter when the at least one device included in production line 300 is controlled according to the experiment pattern.

Specifically, experiment execution portion 14 sequentially selects one experiment pattern from the plurality of experiment patterns generated by generation portion 13. Experiment execution portion 14 changes the target value of each parameter according to the selected experiment pattern. Thus, IO processing portion 10 executes the control arithmetic processing such that the value of each parameter approaches the changed target value, and outputs the data obtained by the control arithmetic processing to the at least one device. Experiment execution portion 14 acquires the value of the specific parameter indicating the quality of the product produced by production line 300 operating according to the changed target value. When acquiring values of specific parameters corresponding to the plurality of products, experiment execution portion 14 calculates a representative value (for example, an average value).

FIG. 11 is a view illustrating an example of the measurement result acquired by the experiment execution portion. As illustrated in FIG. 11, experiment execution portion 14 acquires the measurement result of the specific parameter for each of the plurality of experiment patterns.

Setting portion 15 (see FIG. 4) sets a new target value of the parameter stabilizing the specific parameter in the specified range based on the measurement result acquired by experiment execution portion 14.

Specifically, setting portion 15 determines the target parameter that becomes the setting target of the new setting value among the predetermined number of higher-order parameters extracted by extraction portion 12.

Setting portion 15 performs variance analysis on the measurement results of the plurality of experimental patterns, and calculates fluctuation S, variance V, and a contribution ratio p of each parameter. Setting portion 15 may calculate fluctuation S, variance V, and contribution ratio p using the method disclosed in "Concept and utilization of quality engineering at development design stage-System evaluation and improvement without trial and test-", [online], [searched on Jan. 4, 2022], Internet foundry.jp/bukai/wp-content/uploads/2012/07/e4806f10b0797ec0932d9317dd92a533.pdf.

Furthermore, setting portion 15 calculates the average value of the values of the specific parameters for each level for each parameter, and produces the factor effect diagram based on the calculation result.

Figure 13:
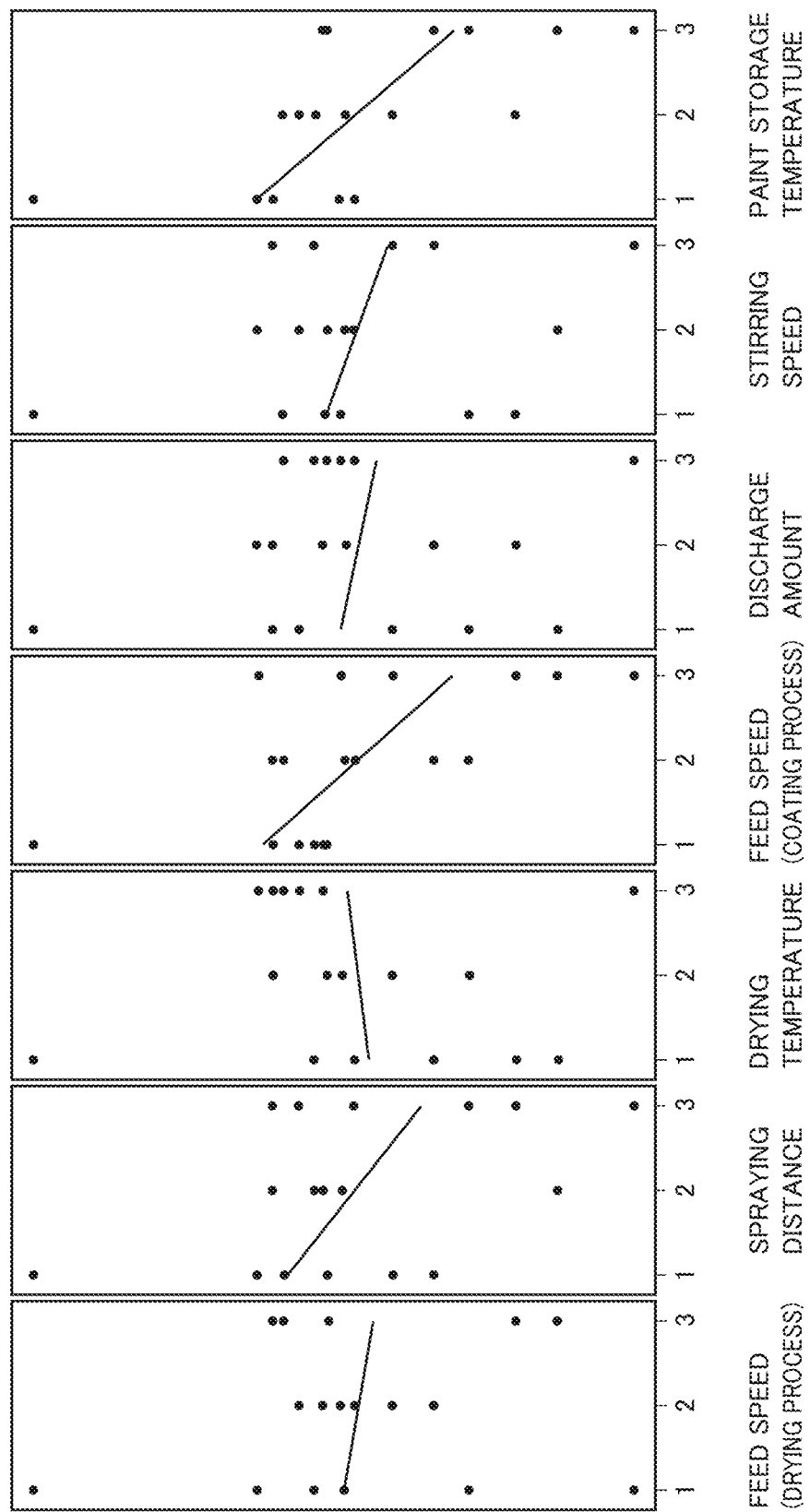
FIG. 13 is a factor effect diagram produced by the setting portion.

FIG. 12 is a view illustrating an example of a result of the variance analysis by the setting portion. FIG. 13 is a factor effect diagram produced by the setting portion.

Contribution ratio p of each parameter is a ratio of fluctuation S of the parameter to a sum of the fluctuations S of all the parameters. As illustrated in FIGS. 12, 13, the parameter having larger contribution ratio p has the larger influence on the specific parameter when the target value is changed. Accordingly, setting portion 15 determines, as the target parameter, the parameter of which contribution rate p exceeds a predetermined threshold or the predetermined number of higher-order parameters in contribution rate p. For example, in the example of FIG. 12, setting portion 15 determines, as the target parameters, the parameters "spraying distance", "feed speed (coating process)", and "paint storage temperature" with the contribution rate exceeding 15%.

In the horizontal axis of FIG. 13, [1], [2], [3] indicate the first level, the second level, and the third level, respectively. As illustrated in FIG. 13, the fluctuation direction (either a positive direction or a negative direction) of the value of the specific parameter when the target value of each parameter is changed from the second level to the first level and the third level is grasped from the factor effect diagram.

Subsequently, setting portion 15 specifies the fluctuation direction of the specific parameter caused by the abnormality in the operation of the at least one device included in production line 300.

Figure 14:
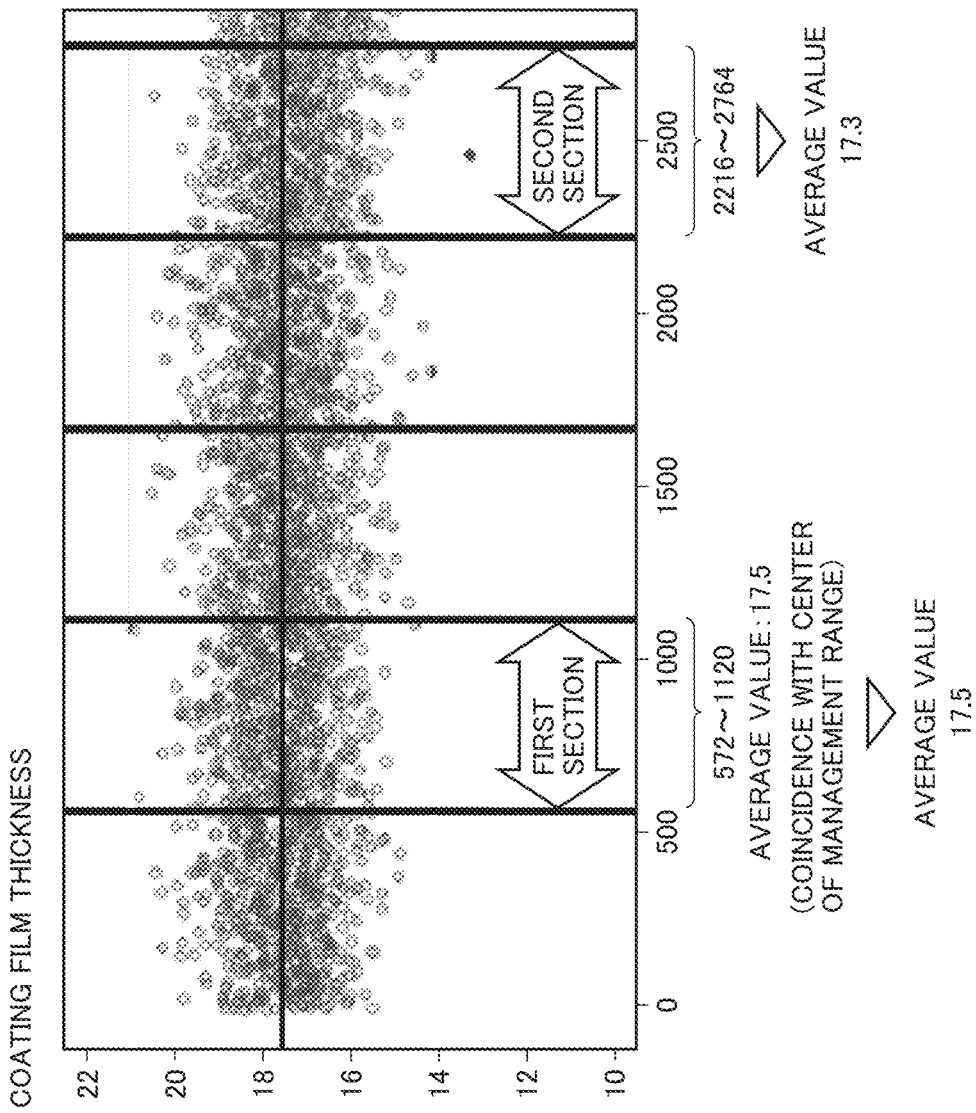
FIG. 14 is a view illustrating an example of a specification method for specifying a fluctuation direction of a specific parameter caused by the abnormality in the operation of the at least one device.

FIG. 14 is a view illustrating an example of a specification method for specifying the fluctuation direction of the specific parameter caused by the abnormality in the operation of the at least one device. Setting portion 15 monitors a moving average of the specific parameter "coating film thickness" and specifies the fluctuation direction of the specific parameter according to the change in the moving average. In the example of FIG. 14, the average value of the specific parameters in a second section (section with product ID "2216 to 2764") after the generation of the abnormality in the operation of the at least one device is lower than that in a first section (section with product ID "572 to 1120") before the generation of the abnormality in the operation of the at least one device. For this reason, setting portion 15 specifies the fluctuation direction of the specific parameter caused by the abnormality in the operation of the at least one device as the "negative direction".

Setting portion 15 preferably verifies whether the difference between the average values of the first section and the second section is significant using a T-test. When the result of the verification of the T-test indicates the significance, setting portion 15 may specify the fluctuation direction of the specific parameter caused by the abnormality in the operation of the at least one device.

At timing when the abnormality is generated in the operation of the at least one device included in production line 300, sometimes the value of the specific parameter does not fluctuate. In such the case, setting portion 15 cannot specify the fluctuation direction of the specific parameter caused by the abnormality of the operation of the at least one device. For this reason, setting portion 15 monitors the moving average of the specific parameter until the variation direction of the specific parameter due to the abnormality of the operation of the at least one device can be specified.

Figure 15:
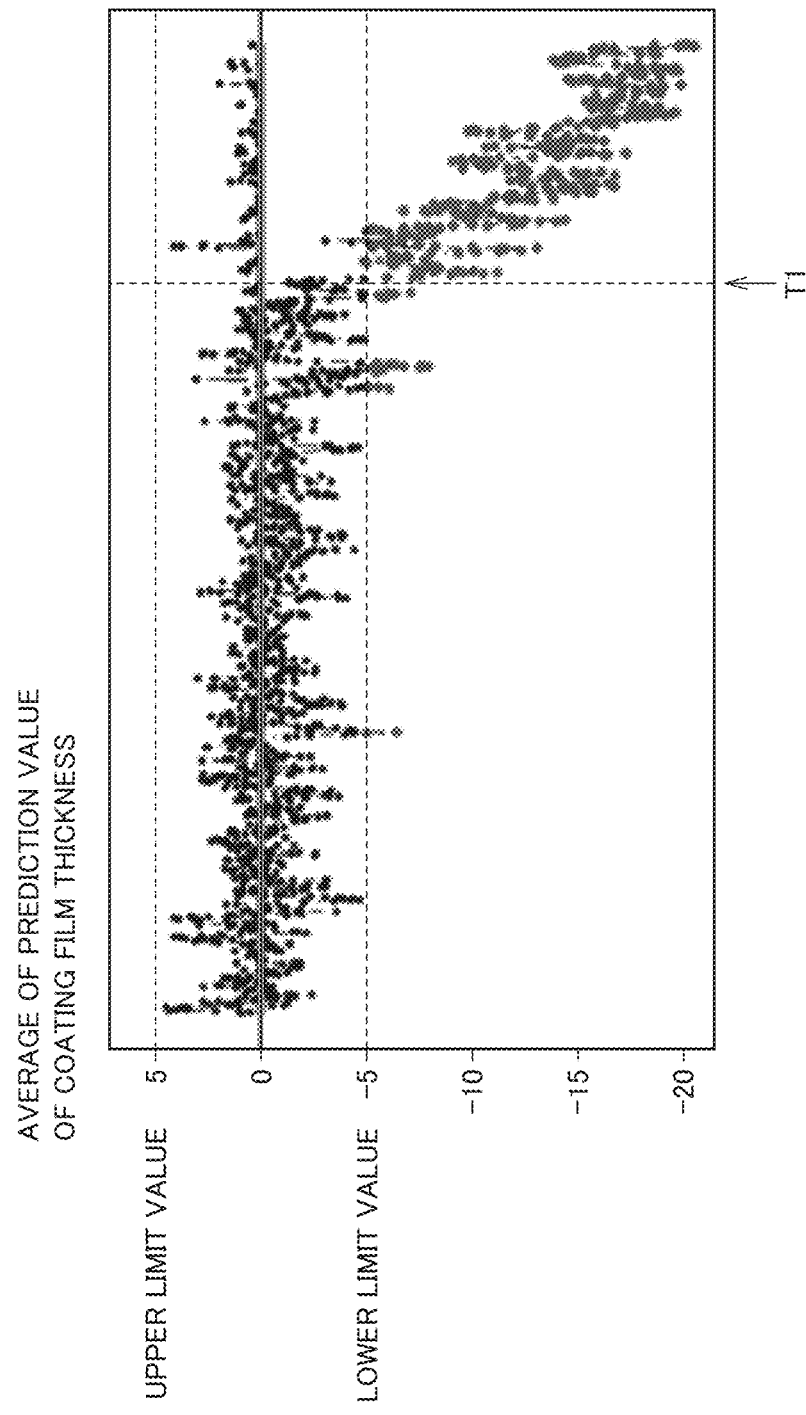
FIG. 15 is a view illustrating another example of the specification method for specifying the fluctuation direction of the specific parameter caused by the abnormality in the operation of the at least one device.

FIG. 15 is a view illustrating another example of the specification method for specifying the fluctuation direction of the specific parameter caused by the abnormality in the operation of the at least one device. FIG. 15 illustrates the transition of the moving average of the prediction value of the specific parameter "coating film thickness" predicted using the T method. In the case of using the T method as the multivariate analysis, setting portion 15 may monitor the moving average of the prediction value of the specific parameter "coating film thickness" and specify the fluctuation direction of the specific parameter caused by the abnormality in the operation of the at least one device. That is, setting portion 15 specifies the fluctuation direction of the specific parameter at timing T1 at which the fluctuation of the moving average becomes significant using the T-test.

For example, the prediction value may be calculated from parameters "coating dilution rate", "stirring speed", "paint storage temperature", "feed speed (coating process)", "air pressure", "room temperature", "discharge amount", and "spraying distance" that are obtained before the drying process. Thus, the fluctuation direction of the specific parameter is identified earlier.

Setting portion 15 sets the new target value of the target parameter according to the fluctuation direction and the fluctuation amount of the specific parameter.

Specifically, setting portion 15 determines a shift direction of the target value of the target parameter (either a direction toward the first level or a direction toward the third level) for changing the value of the specific parameter in a direction opposite to the fluctuation direction of the specific parameter. Setting portion 15 determines the shift direction based on the factor effect diagram in FIG. 13. In the example of FIG. 13, the value of the specific parameter fluctuates to a positive side by shifting the target value of the target parameter to the first level side. Accordingly, when the fluctuation direction of the specific parameter is the negative direction as illustrated in FIG. 14, setting portion 15 determines the shift direction as the direction toward the first level.

Furthermore, setting portion 15 specifies a multiple N of the fluctuation amount of the specific parameter with respect to a standard deviation of the specific parameter. Setting portion 15 considers that each parameter is linear, and shifts the set value of the target parameter in the shift direction by an amount obtained by multiplying the difference between the level corresponding to the shift direction and the second level by N. For example, it is assumed that a standard center of the specific parameter "coating film thickness" is 17.5 μm and that the width of the management range is 4.0 μm (=4σ). In this case, the fluctuation amount of 0.2 μm in FIG. 14 corresponds to 0.2σ. That is, setting portion 15 specifies that the multiple N is 0.2. When the shift direction is the direction toward the first level and the difference between the first level and the second level is $(3/2)^{1/2}\sigma$, setting portion 15 determines a value smaller than the second level by $0.2 \times (3/2)^{1/2}\sigma$ as a new target value of the target parameter.

The new target value set by setting portion 15 is reflected in the control arithmetic processing of IO processing portion 10. Accordingly, IO processing portion 10 executes the control arithmetic processing in which the target parameter approaches the new target value, and outputs the data obtained by the control arithmetic processing to the at least one device. Thus, the value of the specific parameter indicating the quality of the product is stabilized.

Figure 16:
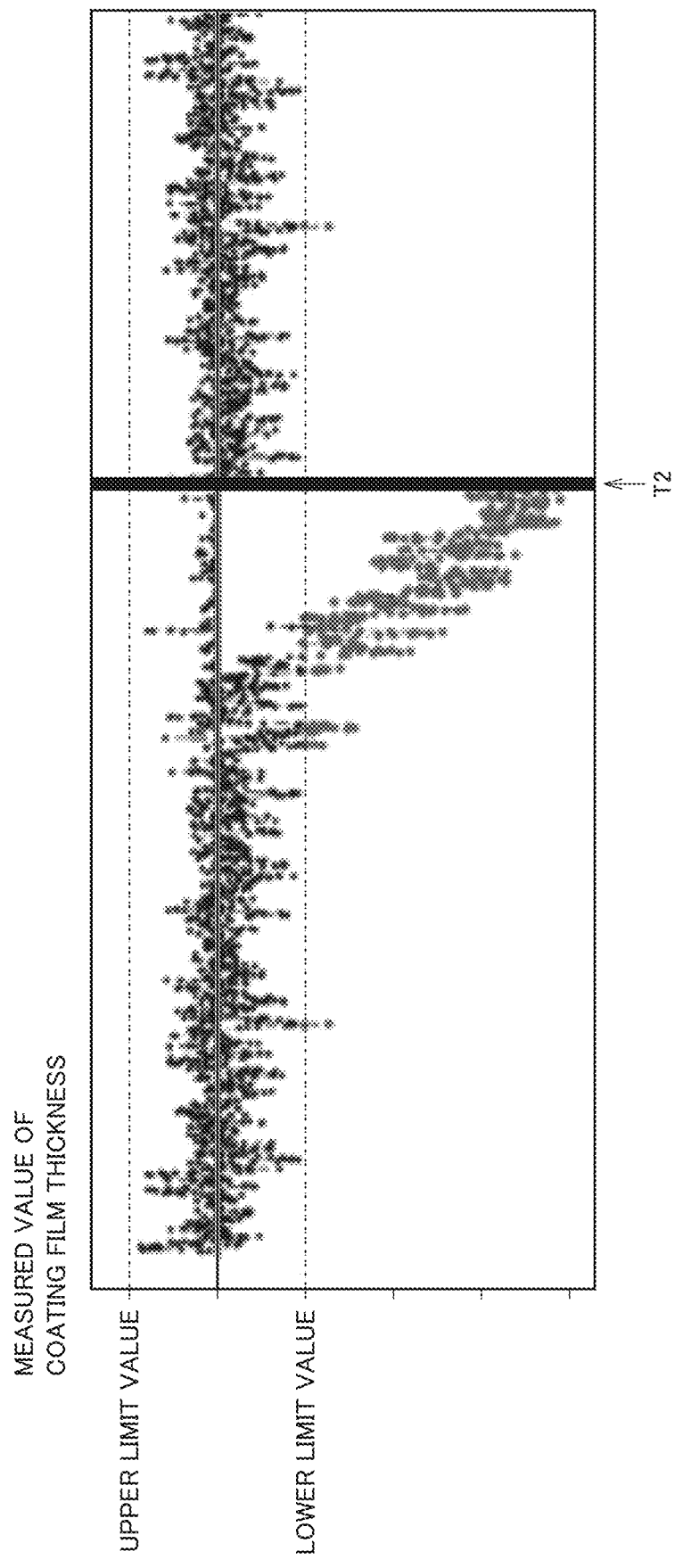
FIG. 16 is a view illustrating an example of the transition of the specific parameter.

FIG. 16 is a view illustrating an example of the transition of the specific parameter. In FIG. 16, timing T2 is timing at which the new target value of the target parameter is set by setting portion 15. As illustrated in FIG. 16, after timing T2, the value of the specific parameter falls within the management range.

The graph (See FIGS. 6 and 7) indicating the transition of the statistic monitored by monitoring portion 11, the information (see FIG. 8) indicating the predetermined number of higher-order parameters extracted by extraction portion 12, the information (see FIG. 11) indicating the experimental result acquired by experiment execution portion 14, the factor effect diagram (see FIG. 13) generated by setting portion 15, and the like may be displayed on the HMI. Thus, the user can grasp the monitoring situation using the multivariate analysis.

§ 3 Appendix

As described above, the embodiment includes the following disclosure.

(Configuration 1)

A control device (100) controlling at least one device (311 to 313, 321, 322, 331, 332) included in a production line (300) producing a product, the control device (100) including:
 a monitoring portion (11, 102) configured to monitor a statistic obtained by performing a multivariate analysis on a plurality of parameters related to an operation of the at least one device (311 to 313, 321, 322, 331, 332);
 an extraction portion (12, 102) configured to extract, from the plurality of parameters, a predetermined number of higher-order parameters in terms of an influence degree on fluctuation of the statistic, in response to a fact that the fluctuation of the statistic is larger than a reference;
 a generation portion (13, 102) configured to generate a plurality of experimental patterns in which combinations of target values of the predetermined number of higher-order parameters are different from each other according to an experimental design method;
 an experiment execution portion (14, 102) configured to acquire, for each of the plurality of experimental patterns, a measurement result of a specific parameter indicating quality of the product when the at least one device (311 to 313, 321, 322, 331, 332) is controlled according to the experimental pattern;
 a setting portion (15, 102) configured to set a new target value of the predetermined number of higher-order parameters in order to stabilize a value of the specific parameter within a management range based on the measurement result; and
 a controller (10, 102) configured to control the at least one device (311 to 313, 321, 322, 331, 332) such that the predetermined number of higher-order parameters approaches the new target value.

(Configuration 2)

The control device (100) described in configuration 1, in which the experimental design method is a method using an orthogonal table.

(Configuration 3)

The control device (100) described in configuration 1 or 2, in which the setting portion (15, 102) performs a variance analysis on the measurement result to calculate a contribution rate of each of the predetermined number of higher-order parameters,
 selects at least one target parameter that is a setting target of the target value from the predetermined number of higher-order parameters based on the contribution rate, and
 sets the new target value of the at least one target parameter.

(Configuration 4)

The control device (100) described in any one of configurations 1 to 3, in which the generation portion (13, 102) generates the plurality of experimental patterns such that each value of the predetermined number of higher-order parameters is any one of a first level, a second level, and a third level,
 the second level is a current target value,
 the first level is smaller than the second level,
 the third level is larger than the second level, and
 the first level and the third level are determined such that the value of the specific parameter falls within the management range.

(Configuration 5)

A control method for controlling at least one device (311 to 313, 321, 322, 331, 332) included in a production line (300) producing a product, the control method including:

monitoring a statistic obtained by performing a multivariate analysis on a plurality of parameters related to an operation of the at least one device (311 to 313, 321, 322, 331, 332);

extracting, from the plurality of parameters, a predetermined number of higher-order parameters in terms of an influence degree on fluctuation of the statistic, in response to a fact that the fluctuation of the statistic is larger than a reference;

generating a plurality of experimental patterns in which combinations of target values of the predetermined number of higher-order parameters are different from each other according to an experimental design method;

acquiring, for each of the plurality of experimental patterns, a measurement result of a specific parameter indicating quality of the product when the at least one device (311 to 313, 321, 322, 331, 332) is controlled according to the experimental pattern;

setting a new target value of the predetermined number of higher-order parameters in order to stabilize a value of the specific parameter within a management range based on the measurement result; and controlling the at least one device (311 to 313, 321, 322, 331, 332) such that the predetermined number of higher-order parameters approaches the new target value.

Although the embodiment of the present invention has been described, it should be considered that the disclosed embodiment is an example in all respects and not restrictive. The scope of the present invention is indicated by the claims, and it is intended that all modifications within the meaning and scope of the claims are included in the present invention.

What is claimed is:

1. A control device controlling at least one device included in a production line producing a product, the control device comprising:

a monitoring portion configured to monitor a statistic obtained by performing a multivariate analysis on a plurality of parameters related to an operation of the at least one device;

an extraction portion configured to extract, from the plurality of parameters, a predetermined number of higher-order parameters in terms of an influence degree on fluctuation of the statistic, in response to a fact that the fluctuation of the statistic is larger than a reference;

a generation portion configured to generate a plurality of experimental patterns in which combinations of target values of the predetermined number of higher-order parameters are different from each other according to an experimental design method;

an experiment execution portion configured to acquire, for each of the plurality of experimental patterns, a measurement result of a specific parameter indicating quality of the product when the at least one device is controlled according to the experimental pattern;

a setting portion configured to set a new target value of the predetermined number of higher-order parameters in order to stabilize a value of the specific parameter within a management range based on the measurement result; and a controller configured to control the at least one device such that the predetermined number of higher-order parameters approaches the new target value.

2. The control device according to claim 1, wherein the experimental design method is a method using an orthogonal table.

3. The control device according to claim 1, wherein the setting portion performs a variance analysis on the measurement result to calculate a contribution rate of each of the predetermined number of higher-order parameters;

selects at least one target parameter that is a setting target of the target value from the predetermined number of higher-order parameters based on the contribution rate; and sets the new target value of the at least one target parameter.

4. The control device according to claim 1, wherein the generation portion generates the plurality of experimental patterns such that each value of the predetermined number of higher-order parameters is any one of a first level, a second level, and a third level, the second level is a current target value, the first level is smaller than the second level, the third level is larger than the second level, and the first level and the third level are determined such that the value of the specific parameter falls within the management range.

5. A control method for controlling at least one device included in a production line producing a product, the control method comprising:

monitoring a statistic obtained by performing a multivariate analysis on a plurality of parameters related to an operation of the at least one device;

extracting, from the plurality of parameters, a predetermined number of higher-order parameters in terms of an influence degree on fluctuation of the statistic, in response to a fact that the fluctuation of the statistic is larger than a reference;

generating a plurality of experimental patterns in which combinations of target values of the predetermined number of higher-order parameters are different from each other according to an experimental design method;

acquiring, for each of the plurality of experimental patterns, a measurement result of a specific parameter indicating quality of the product when the at least one device is controlled according to the experimental pattern;

setting a new target value of the predetermined number of higher-order parameters in order to stabilize a value of the specific parameter within a management range based on the measurement result; and controlling the at least one device such that the predetermined number of higher-order parameters approaches the new target value.

6. The control method according to claim 5, wherein the experimental design method is a method using an orthogonal table.

7. The control method according to claim 5, wherein the setting includes:

performing a variance analysis on the measurement result to calculate a contribution rate of each of the predetermined number of higher-order parameters;

selecting at least one target parameter that is a setting target of the target value from the predetermined number of higher-order parameters based on the contribution rate; and setting the new target value of the at least one target parameter.

8. The control method according to claim 5, wherein the generating includes generating the plurality of experimental patterns such that each value of the predetermined number of higher-order parameters is any one of a first level, a second level, and a third level, the second level is a current target value,
the first level is smaller than the second level,
the third level is larger than the second level, and
the first level and the third level are determined such that the value of the specific parameter falls within the management range.

* * * * *